US005774057A

United States Patent [19]

Kalbermatter

[11] Patent Number: 5,774,057

[45] Date of Patent: Jun. 30, 1998

[54] TIME MEASUREMENT IN A COMMUNICATIONS SYSTEM, A COMMUNICATIONS SYSTEM AND A RECEIVER FOR USE IN SUCH A SYSTEM

[75] Inventor: Stefan Kalbermatter, Grenchen, Switzerland

[73] Assignee: Eta SA Fabriques d'Ebauches, Grenchen, Switzerland

[21] Appl. No.: 522,575

[22] Filed: Sep. 1, 1995

[30] Foreign Application Priority Data

Sep. 24, 1994 [EP] European Pat. Off. .............. 94115093

[51] Int. Cl.[6] ................................ H04H 3/00; H04J 3/06; H04L 7/00

[52] U.S. Cl. ................................ 340/825.21; 340/825.44; 455/31.1; 455/32.1; 455/68; 455/70; 455/132; 370/310; 370/314; 370/319; 370/321; 368/47; 368/187

[58] Field of Search ......................... 340/825.21, 825.44; 455/49.1, 32.1, 33.1, 68, 70, 132, 31.1; 370/310, 314, 319, 321; 368/47, 187

[56] References Cited

U.S. PATENT DOCUMENTS

| | | | |
|---|---|---|---|
| 4,337,463 | 6/1982 | Vangen | 340/825.3 |
| 4,709,402 | 11/1987 | Akerberg | 455/51 |
| 4,746,920 | 5/1988 | Nellen et al. | 340/825.14 |
| 4,879,758 | 11/1989 | DeLuca et al. | 455/296 |
| 5,001,471 | 3/1991 | Snowden et al. | 340/825.21 |
| 5,241,305 | 8/1993 | Fascenda et al. | 340/825.44 |
| 5,363,377 | 11/1994 | Sharpe | 370/100.1 |
| 5,495,233 | 2/1996 | Kawashima et al. | 340/825.21 |
| 5,592,607 | 1/1997 | Weber et al. | 395/358 |
| 5,598,148 | 1/1997 | Koechler | 340/825.21 |

FOREIGN PATENT DOCUMENTS

| | | |
|---|---|---|
| 564220 | 10/1993 | European Pat. Off. . |
| 1596628 | 8/1981 | United Kingdom . |

*Primary Examiner*—Michael Horabik
*Assistant Examiner*—Yonel Beaulieu
*Attorney, Agent, or Firm*—Griffin, Butler Whisenhunt & Szipl

[57] ABSTRACT

A communications system includes apparatus for generating a succession of time message signals, a central station having a transmitter for transmitting the time message signals, at least a first receiver for receiving the time message signals and timer circuits for determining the real time of receipt of each time message signal. Each time message signal is representative of the real time of receipt, by the first receiver, of a preceding time message. The first receiver includes a clock for providing the first receiver with an internal time signal. The clock is reset upon receipt of a first time message signal and is advanced, upon receipt of a subsequent time message signal, by the real time indicated by the subsequent time message signal.

20 Claims, 6 Drawing Sheets

TIME MEASUREMENT IN A COMMUNICATIONS SYSTEM, A COMMUNICATIONS SYSTEM AND A RECEIVER FOR USE IN SUCH A SYSTEM

FIELD OF THE INVENTION

The present invention relates to communications systems comprising means for generating a succession of time message signals, a central station having means for transmitting said time message signals, at least a first receiver for receiving said time message signals and timing means for determining the real time of receipt by said receiver of each time message signal. The invention also relates to a receiver for use in such a communications system. The invention is suitable for use in portable paging devices and it will be convenient to hereinafter disclose the invention in relation to that exemplary application. It is to be appreciated, however, that the invention is not limited to this application.

BACKGROUND OF THE INVENTION

The use of "real time" in the description is intended to mean the actual time of day with respect to an absolute time reference, such as Greenwich Mean Time, as opposed to timing information provided by the clock circuit of a computer or other internal timing source.

U.S. Pat. No. 5,241,305 discloses a digital pager which is operable in accordance with the radiopaging standard known in the field as POCSAG. In order for a user to be able to review chronologically messages sent from a central station and stored in a memory of his pager, each message is stamped with the date and time of receipt. To this end, each pager includes an internal clock which is periodically updated by means of date and time messages transmitted from the central station. Signals from this internal clock can also be used to display the local time of day to the user, for example, by setting the hands of a watch associated with the pager to the appropriate time.

If the time messages could be transmitted at the exact time coded in each message, the internal clock of a pager could be set directly from the message signal transmitted. However, the actual time of broadcast of a time message often varies by up to fifteen minutes from the time of transmission coded in the message.

In order to correct any errors in the pager internal clock, the communication system disclosed in U.S. Pat. No. 5,241,305 transmits with each time message signal an indication of the error in the previously transmitted time message signal, that is the delay in its transmission. Thus, the internal clock of the pager is set on the basis of knowing the previous time message signal, the correction representative of the difference between the time indicated in the previous time message signal and the time of its actual reception, and knowing the time difference, as measured by the pager internal clock, between the times of receipt of the previous and of the current time message signals. Whilst this known technique for setting the internal clock of the pager is accurate, it nevertheless requires the transmission of an error signal within each transmitted time message signal.

According to the POCSAG standard, a synchronisation code word (SCW) is periodically transmitted, followed by eight frames, called a batch, containing the information to be transmitted. Each frame is made up of two 32-bit code words. The information is transmitted in ASCII format. Typically, a time message according to the communications system disclosed in U.S. Pat. No. 5,241,305 comprises time, date and error message information and includes as many as 27 characters. In addition, the address code word (ACW) of the pager in question must be transmitted, this being generally five characters long.

As five characters can be transmitted in each code word, this prior art paging system requires the transmission of a time message signal more than six code words long. This equates to approximately 200 bits of information which must be transmitted. The transmission of this information results in a reduction of broadcast time available to the central station for the transmission of messages, other than time messages, to pagers in the network.

Such a loss of broadcast time is undesirable as it limits the time available within which information can be transmitted to users and thus delays the reception of information by these users. The disadvantages of this system become particularly pronounced when large amounts of information need to be transmitted from the one central station to the pagers of many remote users.

SUMMARY OF THE INVENTION

An aim of the present invention is to provide a communications system and associated receiver which ameliorates or overcomes the disadvantages of existing communications systems and associated receivers.

A further aim of the present invention is to provide a communications system which is simpler and more efficient than prior art communications systems and associated receivers.

Yet another aim of the invention is to provide a communications system and associated receiver which reduces the lost transmission time of existing communications systems and receivers, whilst at least maintaining the time-keeping precision of such communications systems.

According to one aspect of the present invention, there is provided a communications system comprising means for generating a succession of time message signals, a central station having means for transmitting said time message signals, at least a first receiver for receiving said time message signals, and timing means for determining the real time of receipt of each time message signal, characterised in that each said time message signal is representative of the real time of receipt by said first receiver of a preceding time message signal, and in that said first receiver comprises, clock means for providing said first receiver with an internal time signal, means for resetting said clock means upon the receipt of a first time message signal, and means for advancing said clock means, upon receipt of a subsequent time message signal, by the real time indicated by said sequent time message signal.

Another aspect of the present invention provides a receiver for use in a communication system in which a succession of time messages are transmitted by a central station, characterised in that said receiver comprises means for receiving said time message signals, clock means for providing said receiver with an internal time signal, means for resetting said clock means upon receipt of a first time message signal, and means for advancing said clock means, upon receipt of a subsequent time message, by the real time indicated by said subsequent time message signal.

Time message information may therefore be transmitted by the central station to remote pagers without the inclusion of an error signal in each transmitted time message signal. The number of bits which must be transmitted in order to set the time of each pager, as well as the air-time lost during the transmission of this information, is therefore minimised.

The following description refers in more detail to the various features of the paging device of the present invention. In order to facilitate an understanding of the invention, reference is made in the description to the accompanying drawings which illustrate an embodiment of the communications system and receiver. It is to be understood that the communications system and receiver of the present invention are not limited to the embodiment as illustrated in the drawings.

DESCRIPTION OF PREFERRED EMBODIMENTS

Referring now to figure of the drawings, there is shown an example of the communications system 1 comprising a central station 2 which is equipped with a transmitter 3 and a controller 4. This latter includes means for formatting signals to be transmitted. The signals may include pager identification codes and message data such as time and date information.

Figure 1:
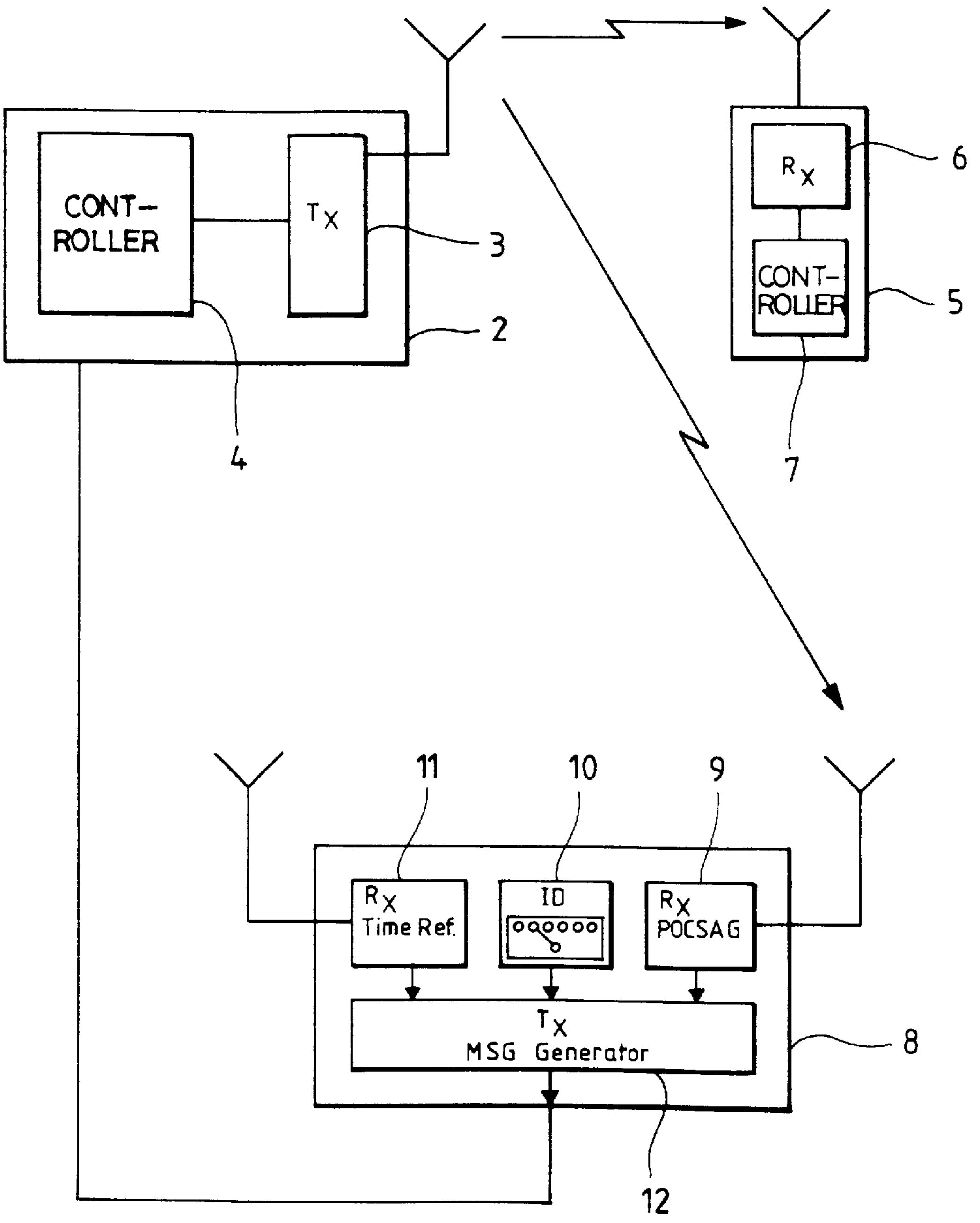
FIG. 1 is a schematic diagram of one embodiment of the communications system according to the present invention.

One or more paging receivers, or pagers, may be provided in a communications system according to the present invention, however only one such pager, indicated by the reference numeral 5, is shown in FIG. 1. The pager 1 includes a radio receiver 6 tuned to the frequency of the transmitter 3 and a controller 7 which controls the energisation of the radio receiver 6, the date and time stamping of received message signals and the energisation of an alerting device, such as an acoustic transducer, in the event of the controller 7 identifying the pager's identification code in a transmitted message.

The communications system of FIG. 1 also includes a message generator/receiver 8 comprising a first radio receiver 9 tuned to the frequency of the transmitter 3, a zone-code generation circuit 10, a further radio receiver 11 and a message generating circuit 12. The radio receiver 11 is tuned to the frequency of a transmitter (not shown) generating real-time messages, such as the Langwellensenders DCF 77 transmitter in Mainflingen, Germany. Alternatively, the radio receiver 11 may be replaced by a real-time clock or other time reference. The message generating circuit 12 periodically generates message signals comprising information from the radio receivers 9 and 11 and the zone-code generation circuit 10. These message signals are sent to the central station 2 for transmission to the pager 5.

Figure 2:
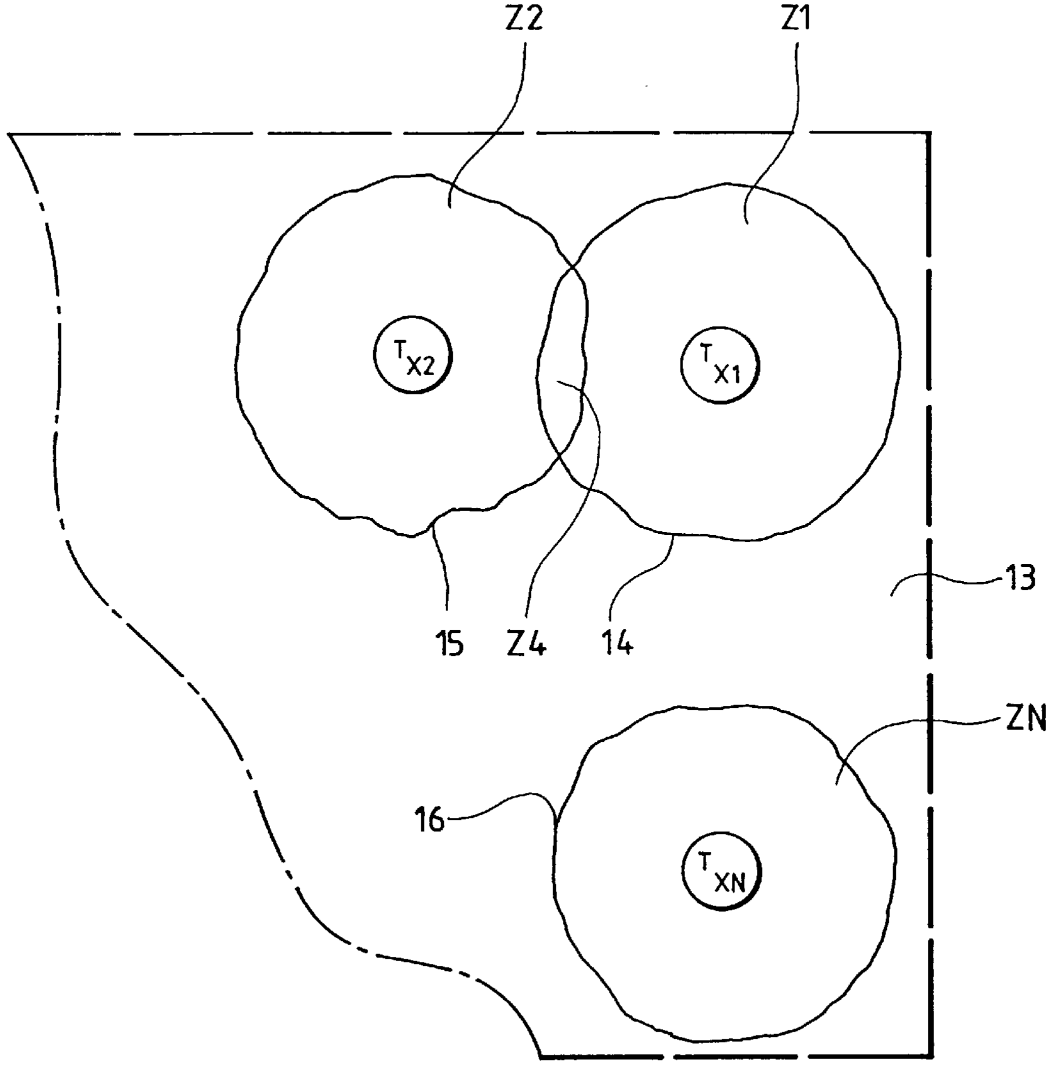
FIG. 2 is a representation of the transmission zones of another embodiment of the communications system according to the present invention.

The communications system of the invention may also comprise a plurality of central stations, each located at the centre of a different zone of transmission within a certain geographical area. Switzerland, for example, comprises five such transmission zones which collectively insure that a pager is able to receive message information practically anywhere within the country. FIG. 2 illustrates a geographic area 13 as it might be divided into transmission zones such as Z1, Z2, . . . , ZN, having a typical region of overlapping coverage as denoted by zone Z4. Other zones may exist within the geographic area 13 but are not shown. For the sake of clarity, only the zones Z1, Z2 and ZN are represented in figure Z.

Each of the three zones Z1, Z2 and ZN shown in FIG. 2 have associated therewith a central station and message generator/receiver, such as the central station 2 and the message generator/receiver 8 shown in FIG. 1. The transmitter $T_{x1}$ of the central station associated with the zone Z1 has a coverage area within the circle 14, the transmitter $T_{x2}$ of the central station associated with the zone Z2 has a coverage area within the circle 15, and so on all the way up to the transmitter $T_{xN}$ of the central station associated with the zone ZN which has a coverage area within the circle 16. The zone-code generating circuit 10 shown in FIG. 1 creates a code representative of the particular zone within which the central station 2 is located for inclusion in the message signal generated by the message generating circuit 12.

Figure 3A:
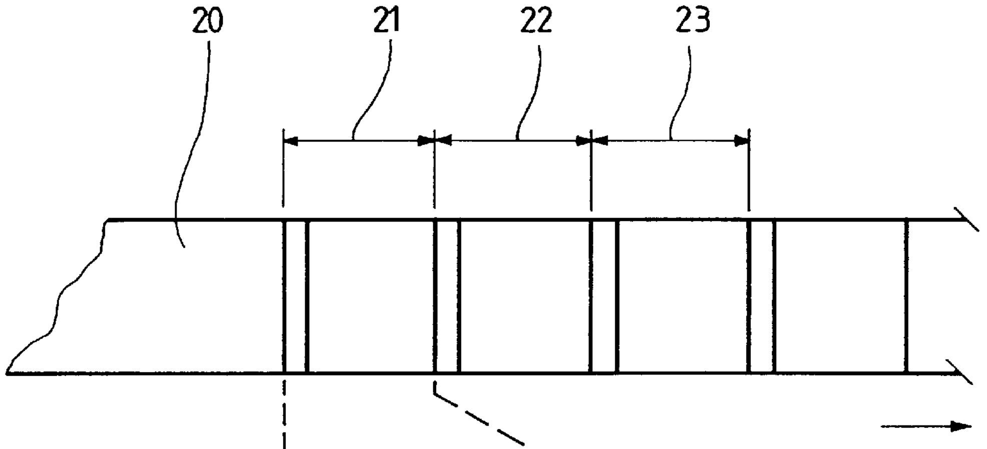
FIGS. 3A and 3B are diagrams of the POCSAG signal format.
Figure 3B:
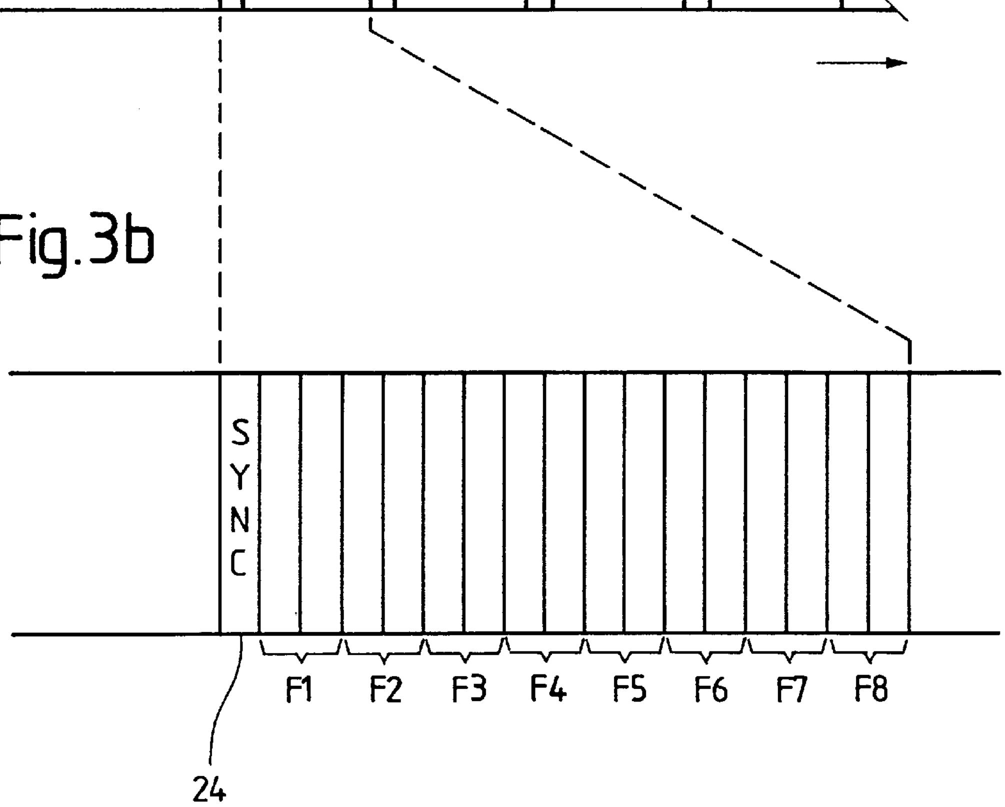

The format of the transmitted message signals is CCIR Radiopaging Code No.1, otherwise known by persons in the paging field as POCSAG. This format will now be briefly explained with reference to FIGS. 3A and 3B. The transmissions from the central station 2 each comprise a series of bursts, each burst comprising a preamble 20 of 576 bits which enables the pager 5 to achieve bit synchronisation, followed by batches 21, 22, 23, etc. of codewords formed by pager identification codes and data messages. The first codeword is a synchronisation codeword 24 which is used by a pager to achieve and maintain synchronisation. The remaining sixteen codewords are paired and each of the eight pairs is termed a frame, i.e. frames F1 to F8. Each pager is assigned to a particular frame which means that, if necessary its pager identification code, will be transmitted in that frame only. The pager must therefore energise its radio receiver firstly to be able to receive the synchronisation codeword 24 and secondly for the duration of its assigned frame.

Data messages comprise an address codeword plus one or more message codewords. The transmission of date and time messages may occur at regular intervals, for example, once every two minutes, once every certain number of batches, or once every burst. In practice, the repetition of the transmission of such date and time messages may vary from between once-a-minute to once-every-hour depending on the characteristics of the network associated with each central station. In the case of the first of these examples, date, time and zone information is generated once every two minutes by the message generating circuit 12 and sent to the central station 2 for formatting and transmission via the transmitter 3 as a series of 4-bit hexadecimal characters. The transmitted information may have the form of hour, minute, second, zone, day, month and year, such as 12 hours, 15 minutes, 35 seconds, zone 3, 29 Dec. 1994. The message signal generated by the message generating circuit 12 may thus be the 4-bit hexadecimal equivalent of:

12_15_35_03_29_12_94, where the symbol "_" represents a character separator.

More particularly, the first code word in the frame assigned to the pager 5 includes function bits indicative of the fact that the following code words either contain date, time and zone information or that they do not. A paging receiver wishing to receive such a message signal is programmed to energise its radio receiver in order to check if this code-word contains date, time and zone information, and if so, to remain energised for these frames.

Figure 4:
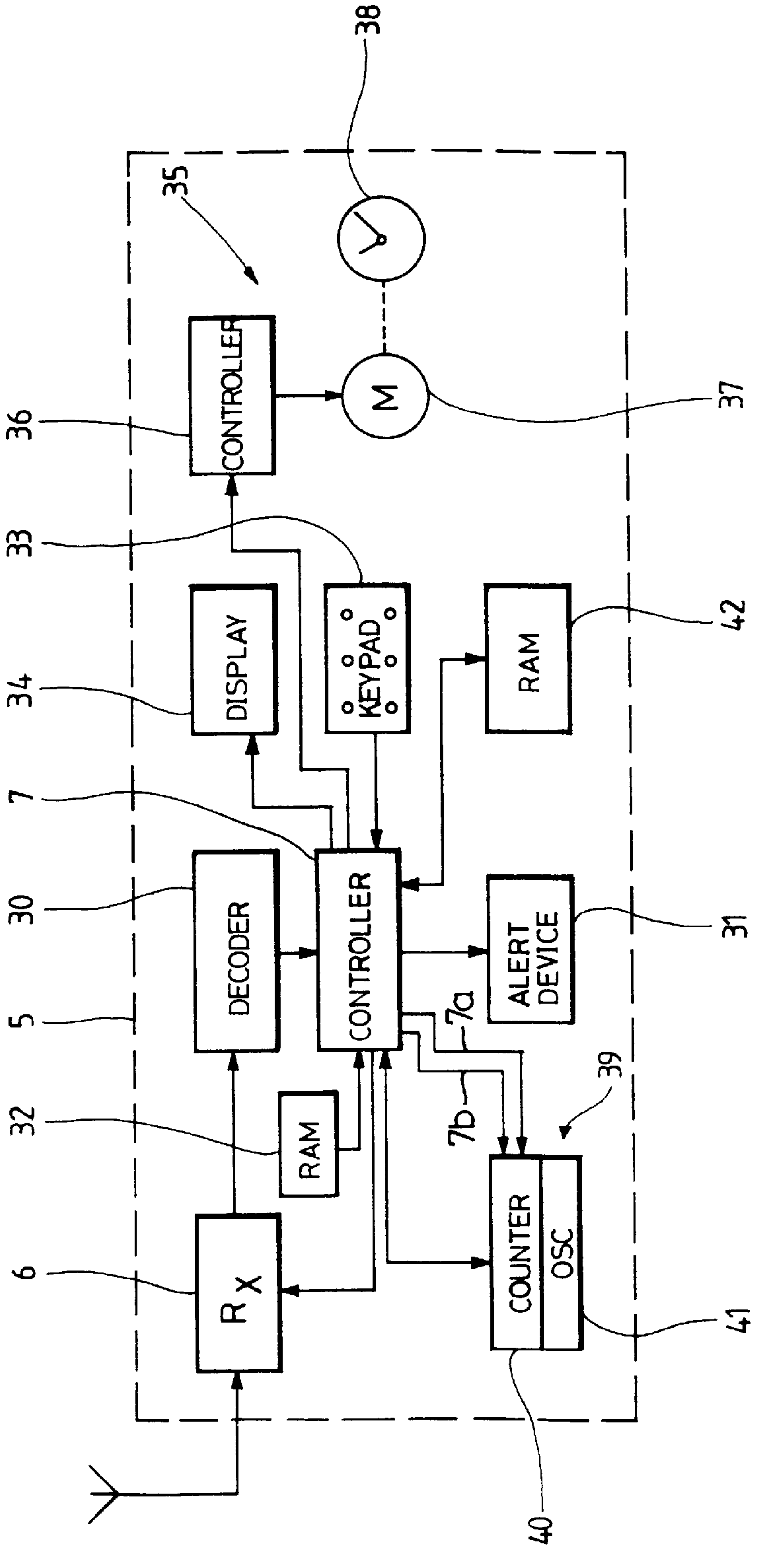
FIG. 4 is a schematic block diagram of a pager for use with the communications system of FIG. 1.

Referring to FIG. 4, the pager 5 comprises the radio receiver 6 and the controller 7 shown in FIG. 1. The pager 5 further comprises a decoder 30 connected between the output of the receiver 6 and an input to the controller 7. The decoder 30 accepts any signal received during the periods when the receiver is energised and sends each codeword of the signal to the controller 7.

This latter firstly checks whether the address codeword corresponds to one of the identification codes stored within the controller's memory. If there is correspondence, the controller 7 causes an alert device 31 to be energised. If the received signal comprises data message codewords, the controller 7 stores these together with a date and time stamp in a RAM 32. In response to a user command via a keypad 33 or other user input device, the controller 7 causes the contents of the RAM 32 to be read out and supplied to a data display device 34. In addition, the pager 5 also includes means 35 for displaying the current time-of-day comprising a motor controller 36 and a motor 37 for driving a display device 38, such as the hour and minute hand of a watch dial.

Figure 5:
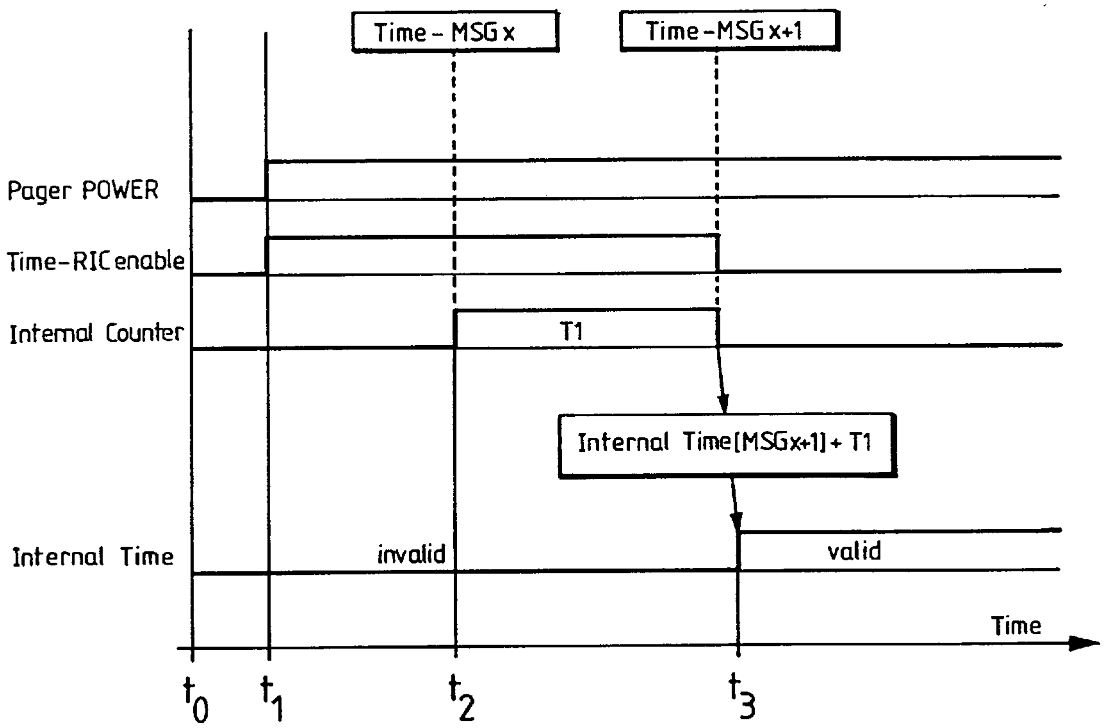
FIG. 5 is a timing diagram of the operation of the pager of FIG. 4.

A timing stage 39 is connected to the controller 7 and provides an internal time signal to the controller 7 so that it can carry out various operations, including, for example, the display of the current time-of-day to the user via the time display means 35. The timing stage 39 includes a counter 40 and an oscillator 41 for providing timing pulses to the counter 40. When the pager 5 is firstly energised, the contents of the counter 40 do not correspond to the current time-of-day. Referring now to FIG. 5, upon receipt of a first time message signal (Time-MSG x), the controller 7 sends a signal at an output 7*a* to reset the contents of the counter 40 to zero. Thereafter, the contents of the counter 7 increases at a rate set by the oscillator 41.

Upon receipt of a subsequent time message signal (Time-MSG x+1) at a time T1 after the receipt of the first time message signal, the controller 7 firstly verifies that this subsequent time message signal contains the same zone code as does the previous time message signal. If this is the case, the controller stores the year, month, day, zone and time information in a RAM 42. The inclusion of a code identifying the zone from which the time message signal was transmitted enables the controller 7 to assure that the first and subsequent time message signals have been transmitted by the same central station.

In this way, the time information contained in the second time message signal relates to the first time message signal, rather than to a time message signal detected by a pager but transmitted by another central station within the communications system. This will be notably the case if the pager 5 is used in an area in which two or more transmission zones overlap, as is shown in FIG. 2 by the zone Z4. Prior art communications systems, such as that disclosed in U.S. Pat. No. 5,241,305, are incapable of distinguishing between time message signals transmitted by different central stations therewithin. Accordingly, the time message signals of such a prior art communications system cannot be used to accurately set the internal clock of a pager operating in such a communications system when the pager is used in a region of overlapping zones i.e. zone Z4 of. FIG. 2.

The controller 7 then supplies the counter 40 with the value of the time information and, upon sending a signal from its output 7*b,* causes the time information value to be added to the contents of the counter 40. As will be explained shortly, this series of operations has the effect of setting the contents of the counter 40 to a value representative of the current time-of-day.

Referring once again to FIG. 1, a time message signal is generated by the message generating circuit 12 and is supplied to the controller 4 of the central station 2. The controller 4 adapts the signal to an appropriate format and stores it temporarily in readiness for transmission by the transmitter 3 at the required moment, that is, in the assigned frame of a message signal and when the transmitter 3 is not occupied with the transmission of other message signals. The date and time signal is received by those pagers adapted to receive these signals. However, due to the fact that the actual time of broadcast of a time message differs from the time information coded in the message, the counter 40 of the pager 5 can not be set directly from this information.

The manner in which the counter 40 of the pager 5 is set so as to indicate the current time-of-day will be now explained with reference to FIGS. 5 and 6. At a time $t_0$, the pager 5 is not energised and the contents of the counter 40 are zero. Under these conditions, the internal time, as represented by the contents of the counter 40, is invalid. At a time $t_1$, the pager 5 is switched on by its user and the pager 5 passes into a state whereby the updating of the contents of the counter 40 is enabled.

Figure 6:
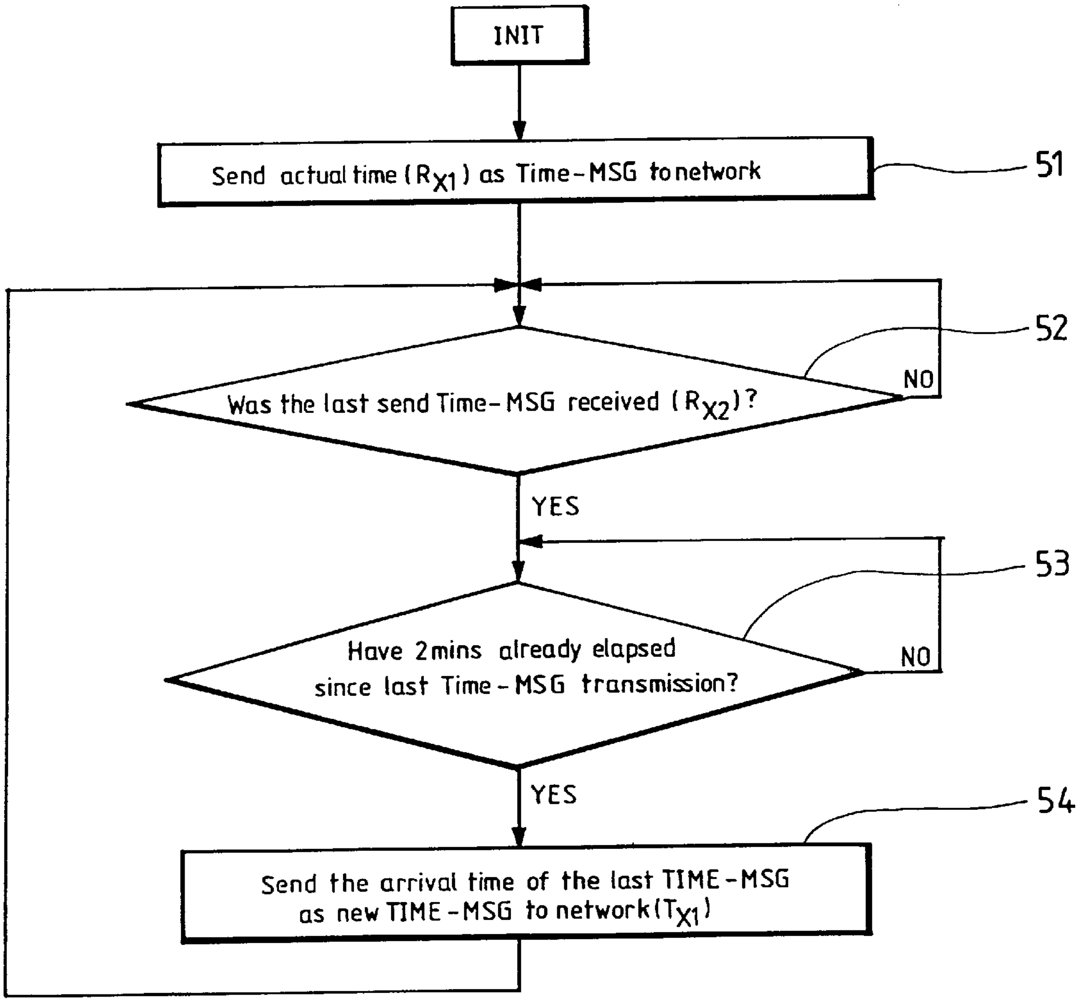
FIG. 6 is a flow diagram of the operation of the pager of FIG. 4.

As seen in FIG. 6, the timing means 8 periodically receives time message signals from the central station 2 and generates time message signals for transmission by the central station 2. When, at the step 51, a time message signal is generated, the current time-of-day as received by the receiver 11 is included in that time message. This time message (Time-MSG x) is sent to the central station 2 and transmitted, after a certain delay, by the transmitter 3 at a time $t_2$. In response to the detection of this time message signal, the controller 7 of the pager 5 resets the counter 40 to zero.

At the step 52, the timing means 8 detects whether or not the time message signal last generated has been received by the receiver 9. If this time message signal has been received and, at step 53, it is decided that more than two minutes have passed since the reception of the last time message signal from the central station, the timing means 8 generates, at step 54, a new time message signal (Time-MSG x+1) The time information in this time message signal corresponds to the current time-of-day from the receiver 11, when the previous time message signal was received.

After a certain delay, this time message signal is transmitted by the transmitter 3 and detected, at a time $t_3$, by the pager 5. The controller 7 stores the time information in this second time message signal in the RAM 42 and then adds a value representative of this information to the contents of the counter 40. After this operation, the contents of the counter 40 are representative of the value (Time-MSG x+1)+T1 and hence of the current time-of-day.

By way of example, a time message signal containing the time information 12:00:00 may be generated by the timing means 8 (this time information being the time of receipt of the previously transmitted time message signal), but may not be transmitted by the transmitter 3 until 12:03:01. The detection of this time message signal causes the counter 40 to be reset to zero, but due to the pulse from the oscillator 41, it continues counting at a real-time rate.

Having detected this first time message, the timing means 8 generates a subsequent time message signal, containing the time information 12:03:01. This time message signal may not be transmitted until 12:07:35.

When this subsequent time message signal is detected by the receiver 6, the contents of the counter 40 are representative of the time 00:04:34, that is, the difference in time between the detection of the first time message signal at 12:03:01 and the detection of the second time message signal at 12:07:35. At this moment, the controller 7 adds a value corresponding to 12:03:01, that is, the time information contained in the time message signal transmitted at the time 12:07:35, to the contents of the counter 40. The contents of the counter 40 thus have value corresponding to the time 12:07:35. In other words, the counter 40 has been set to the current time-of-day in a simple and efficient manner that does not require the transmission of an error signal. The number of characters which must be transmitted by the central station 2 with each time message signal is therefore less than in existing communications systems and results in a reduction in the air-time loss due to this transmission.

Finally, it is to be understood that various modifications and/or additions may be made to the communications system and receiver without departing from the ambit of the present invention as defined in the claims appended hereto. For example, a further reduction in the air-time loss may be had in eliminating the character separators from each time message signal transmitted by each central station in the communications system.

Whilst the invention has been described in relation to the POCSAG format of transmitting message signals, it is to be appreciated that any other appropriate format, such as GOLAY, may also. be used therewith.

What we claim is:

1. A communications system comprising:

means for generating a succession of time message signals;

a central station having means for transmitting said time message signals;

at least a first receiver for receiving said time message signals; and timing means for determining the real time of receipt of each time message signal, said communications system being characterized in that each said time message signal is representative of the real time of receipt by said first receiver of a preceding time message signal, and in that said first receiver comprises:

clock means for providing said first receiver with an internal time signal;

means for resetting said clock means upon the receipt of a first time message signal; and means for advancing said clock means, upon receipt of a subsequent time message signal, by the real time indicated by said subsequent time message signal.

2. A communications system according to claim 1, wherein said clock means comprises:

a counter having an output for providing said internal time signal; and means for incrementing the contents of said counter so that the contents of the counter represent a time interval.

3. A communications system according to claim 2, wherein said means for advancing said clock means comprises means for adding a value representative of the real time indicated by said subsequent time message signal to the contents of said counter.

4. A communication system according to claim 1, wherein said timing means comprises:

a second receiver for receiving said time message signals; and means for determining the real time of receipt of each time message signal by said second receiver.

5. A communications system according to claim 4, wherein said means for determining the real time of receipt of each time message signal comprises a real time clock.

6. A communications system according to claim 4, wherein said means for determining the real time of receipt of each time message signal comprises a third receiver for receiving real-time messages.

7. A communications system according to claim 1, wherein said timing means comprises means for generating a zone-code for inclusion in said time message signals, said zone-code being indicative of the transmission coverage area of said central station.

8. A communications system according to claim 7, wherein said first receiver comprises means for assuring that said first and said subsequent time-message signals include the same zone-code.

9. A receiver for use in a communication system in which a succession of time message signals are transmitted by a central station, said receiver comprising:

means for receiving said time message signals;

clock means for providing said first receiver with an internal time signal;

means for resetting said clock means upon the receipt of a first time message signal; and means for advancing said clock means, upon receipt of a subsequent time message signal, by the real time indicated by said subsequent time message signal.

10. A receiver according to claim 9, wherein said clock means comprises:

a counter having an output for providing said internal time signal; and means for incrementing the contents of said counter so that the contents of the counter represent a time interval.

11. A receiver according to claim 10, wherein said means for advancing said clock means comprises means for adding a value representative of the real time indicated by said subsequent time message signal to the contents of said counter.

12. A receiver according to claim 9 wherein said time message signals comprise a zone-code indicative of the transmission coverage area of said central station, said receiver further comprising means for assuring that said first and said subsequent time-message signals include the same zone-code.

13. A communications system according to claim 2, wherein said timing means comprises:

a second receiver for receiving said time message signals; and means for determining the real time of receipt of each time message signal by said second receiver.

14. A communications system according to claim 3, wherein said timing means comprises:

a second receiver for receiving said time message signals; and means for determining the real time of receipt of each time message signal by said second receiver.

15. A communications system according to claim 13, wherein said means for determining the real time of receipt of each time message signal comprises a real time clock.

16. A communications system according to claim 13, wherein said means for determining the real time of receipt of each time message signal comprises a third receiver for receiving real-time messages.

17. A communications system according to claim 14, wherein said means for determining the real time of receipt of each time message signal comprises a third receiver for receiving real-time messages.

18. A receiver according to claim 10, wherein said time message signals comprise a zone-code indicative of the transmission coverage area of said central station, said receiver further comprising means for assuring that said first and said subsequent time-message signals include the same zone-code.

19. A communications system comprising:

means for generating a succession of time message signals;

a central station including a transmitter for transmitting the time message signals;

a first pager including a first receiver for receiving the time message signals transmitted by said central station;

said means for generating a succession of time message signals including a second receiver for receiving the transmitted time message signals;

said means for generating a succession of time message signals further including means for generating a first time message signal representing real time and means responsive to said second receiver for generating succeeding time message signals representing the real time at which an immediately preceding one of said succession of time message signals was transmitted by said transmitter;

said pager including, a counter which is reset upon reception of said first time message signal by said first receiver, means for incrementing the counter so that its contents represent the passage of time, and means for adding to the contents of said counter a time value in the next succeeding time message signal received by said first receiver.

20. A communications system as claimed in claim 19, wherein said means for generating a succession of time message signals includes a third receiver for receiving indications of real time transmitted from an absolute time reference source.

* * * * *